H. R. Ladd.
Churn.
Nº 38,687.    Patented May 19, 1863.
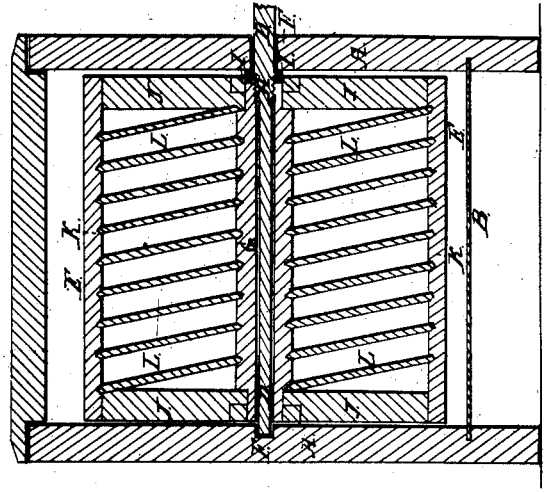
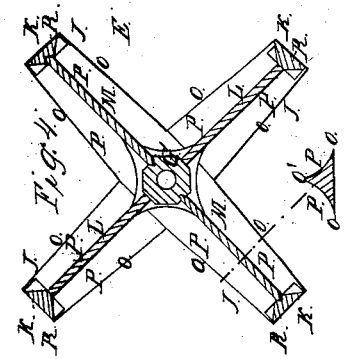
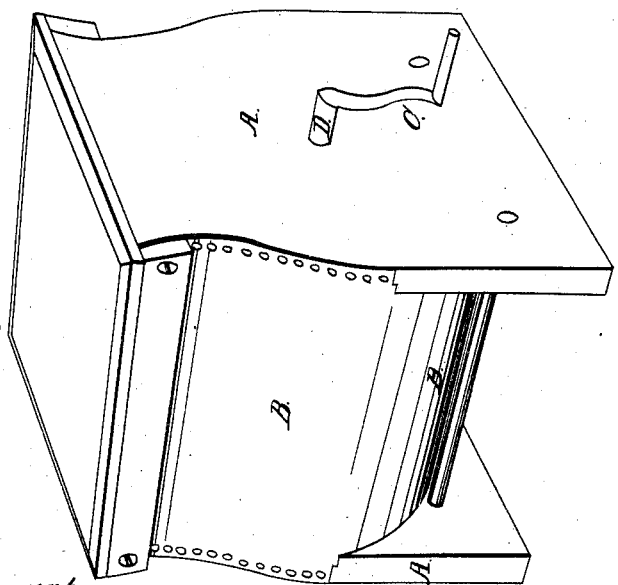
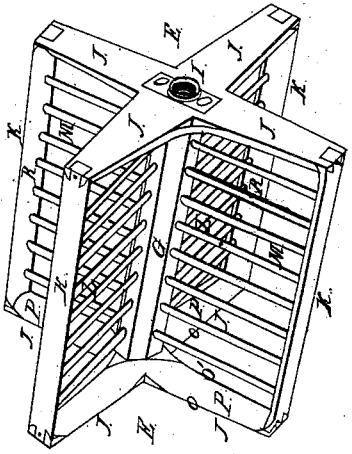
Witnesses,
W. H. Burlings
Henry Poth.
Inventor;
H R Ladd

UNITED STATES PATENT OFFICE.

H. R. LADD, OF ORWELL, OHIO.

IMPROVEMENT IN CHURNS.

Specification forming part of Letters Patent No. 38,587, dated May 19, 1863.

*To all whom it may concern:*

Be it known that I, H. R. LADD, of Orwell, in the county of Ashtabula and State of Ohio, have invented certain new and useful Improvements in Churns; and I do hereby declare that the following is a full, clear, and exact description thereof, reference being had to the annexed drawings, making part of this specification, in which—

Figure 1 is a perspective view of the churn; Fig. 2, a vertical section; Figs. 3 and 4, views of the dasher detached from the case.

Like letters denote like parts in the several views.

To enable others skilled in the art to make and use my invention, I will proceed to describe its construction and operation.

The general form of the case is seen in Fig. 1, and may be made of any desirable size. The sides A are of wood, and the ends and bottom B of suitable metal, and is curved in form according to the sweep of the dasher. The crank C is connected to the shaft D, which supports and which operates the dasher E, the said shaft having suitable bearings at F F. The dasher-shaft G forms a sleeve through which passes the shaft D, as seen in Fig. 2. Upon the shaft D at H is cut a screw, which fastens into the nut I, Figs. 1 and 2. This nut, being secured to the dasher, connects the shaft and dasher. By this means the dasher is readily connected and disconnected with the shaft and case, as may be needed in cleaning and other purposes. To each end of the sleeve-shaft G are secured transverse arms J, Figs. 3 and 4, to the ends of which is attached a bar, K, and between this bar and the sleeve are fastened a series of beaters or rods, L and M, by the ends of which passing into the sleeve and bar, as seen in Figs. 2 and 4, the bar retains said rods in place. These rods or beaters may be placed at any desirable angle, so as to produce the best effect. In this dasher two sets of the beaters are at right angles to the sleeve G, and the other two sets are placed at an acute and obtuse angle, as seen in Figs. 2 and 3. By this arrangement the beaters do not follow in each other's wake, but cross each in their circuit at various angles, thus producing a greater agitation to the milk and cream, and the butter more readily develops than in the ordinary mode. The arms J are flat upon the side next to the cases, while the inside of them are curved from the edge O to the center O', as seen in the transverse section, Fig. 4. By means of the curve P in the arms the milk and cream are thrown from the sides toward the center. The bar K is also curved at R along the entire length on the inside, which tends to throw or divert the milk and cream toward the center, from which they are forced back by the centrifugal force of the beaters. The curving of the arms J and rail K also allows them to revolve more easily in the fluid.

What I claim as my improvement, and desire to secure by Letters Patent, is—

The shaft D, sleeve G, arms J, and bars K, when used in combination with the beaters L and M, these several parts being constructed, arranged, and operated as and for the purpose set forth.

H. R. LADD.

Witnesses:
   A. H. ROWLEY,
   E. L. GIBBS.